Dec. 11, 1951 J. J. SCHMITT 2,578,208
AERATING MIXING SPOON
Filed Aug. 23, 1947

Inventor
Joseph J. Schmitt
By Ralph Hanna
Attorney

Patented Dec. 11, 1951

2,578,208

UNITED STATES PATENT OFFICE 2,578,208

AERATING MIXING SPOON

Joseph J. Schmitt, Erie, Pa.

Application August 23, 1947, Serial No. 770,233

1 Claim. (Cl. 259—144)

This invention is a mixing spoon useful in mixing cake batter and the like. It functions by trapping air in an inverted bowl and forcing the air into the batter during the stirring.

Figure 1:
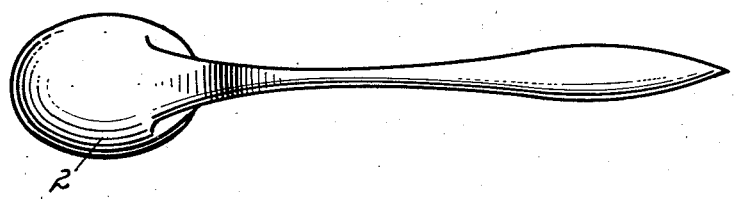
Figure 2:
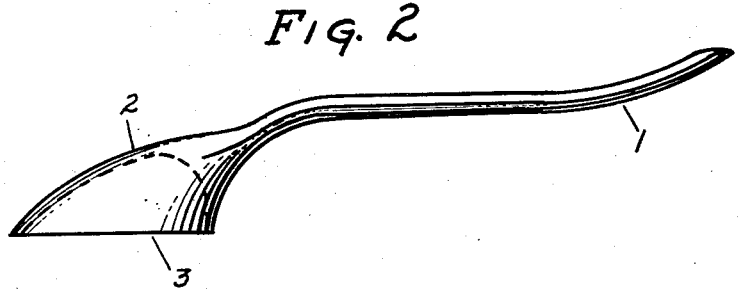
Figure 3:
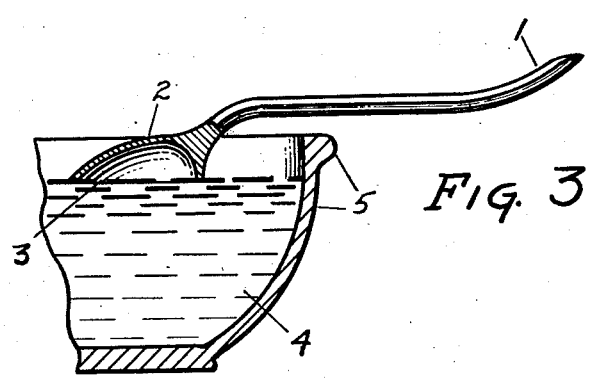

In the drawing, Fig. 1 is a top plan view of a mixing spoon; Fig. 2 is a side elevation; and Fig. 3 is a view illustrating the use of the spoon.

The spoon has a handle 1 and an inverted bowl 2. As shown in Fig. 3, in use the lips 3 of the bowl are preferably generally parallel to the surface of the batter or other liquid being mixed. At least, there is a substantial cavity in which air is trapped before the lips pass completely below the surface of the liquid. The handle is offset laterally and above the plane of the lips of the bowl so as to clear the edge of a mixing bowl 5 and with a hand grip outside and above the edge of the mixing bowl.

For best results the stirring or mixing is effected with a rotary motion about a generally horizontal axis along the length of the handle with the bowl at all times in the inverted position and at least a part of the lips of the bowl rising slightly above the surface of the liquid in its uppermost position. As the bowl moves down and sidewise through the liquid, the air trapped in the bowl is forced or beaten into the liquid. From one aspect, the bowl is a pocket in which air is trapped.

What I claim as new is:

A mixing spoon for mixing batter comprising a bowl formed with a lip and having a concave and convex side, a handle rigid with and connected with the bowl of the spoon a substantial distance away from the lip of the bowl on the convex side and extending initially at an angle to the plane of the lip and then generally parallel to the plane of the lip to hand-grip, the bowl in its normal position during use being inverted with the concave side of the bowl downwardly presented and providing a pocket trapping and beating air into the batter as the spoon is moved with the conventional stirring motion.

JOSEPH J. SCHMITT.

REFERENCES CITED

The following references are of record in the file of this patent:

UNITED STATES PATENTS

| Number | Name | Date |
|---|---|---|
| D. 86,607 | Johannes | Mar. 29, 1932 |
| 99,312 | Hamblin | Feb. 1, 1870 |
| 614,138 | Sims | Nov. 15, 1898 |
| 2,004,756 | Hess | June 11, 1935 |

FOREIGN PATENTS

| Number | Country | Date |
|---|---|---|
| 703,855 | Germany | Mar. 20, 1941 |